(12) United States Patent
Ballantyne et al.

(10) Patent No.: US 6,601,004 B2
(45) Date of Patent: Jul. 29, 2003

(54) METHOD AND APPARATUS FOR MEASURING PARAMETERS OF AN ELECTRONIC SYSTEM

(75) Inventors: Alex Ballantyne, Edinburgh (GB); David Taylor, Edinburgh (GB)

(73) Assignee: Agilent Technologies, Inc., Palo Alto, CA (US)

( * ) Notice: Subject to any disclaimer, the term of this patent is extended or adjusted under 35 U.S.C. 154(b) by 81 days.

(21) Appl. No.: 09/845,197

(22) Filed: May 1, 2001

(65) Prior Publication Data

US 2001/0044701 A1 Nov. 22, 2001

(30) Foreign Application Priority Data

May 2, 2000 (EP) .............................. 00303669

(51) Int. Cl.⁷ .......................... G01R 29/02; G06F 19/00; F24F 7/00
(52) U.S. Cl. ...................... 702/79; 324/76.77
(58) Field of Search ............... 702/57, 79, 89, 702/176, 187; 700/306; 324/76.77

(56) References Cited

U.S. PATENT DOCUMENTS 5,557,196 A * 9/1996 Ujiie ...................... 324/76.77

FOREIGN PATENT DOCUMENTS

| EP | 0 282 229 A2 | 9/1988 |
|---|---|---|
| EP | 0 697 774 A1 | 2/1996 |
| GB | 2 312 353 A | 10/1997 |
| WO | WO97/32392 | 9/1997 |

OTHER PUBLICATIONS

Bregni, S. et al., "Fast Computation of Maximum Time Interval Error by Binary Decomposition," IEEE International Conference on Communications, vol. 3 (Jun. 6, 1999), pp. 1741–1745.

Bregni, S., "Measurement of Maximum Time Interval Error for Telecommunications Clock Stability Characterization," IEEE Transactions on Instrumentation and Measurement, vol. 45, No. 5 (Oct. 1996), pp. 900–906.

Dobrogowski, A. et al., "Direct Approach to MTIE Calculation," Proceedings of the 1999 Joint Meeting of the European Frequency and Time Forum and the IEEE International Frequency Control Symposium, vol. 2 (Apr. 13, 1999), pp. 1121–1124.

ICT Electronics advertisement, "Flexacom Plus," http:://www.ict.es.

* cited by examiner

Primary Examiner—Bryan Bui
Assistant Examiner—John Le (57) ABSTRACT

Timing errors in digital transmission systems, such as maximum time interval error, are measured with data samples processed in a first stage to produce in real-time a first, time-varying series of measurements for a given parameter over observation intervals of a first magnitude. Each observation interval is many times longer than the sample period of the input series. Subsequent stages derive further measurements, corresponding to increasingly longer observation intervals, derived by treating previous observation intervals as sub-intervals. The first stage derives intermediate results for a predetermined interval and repeats for successive sub-intervals. The intermediate results are stored in a first first-in, first-out (FIFO) data set and updated at least once per sub-interval and the required parameter is derived. The second and subsequent stages similarly derive the required parameter corresponding to increasing observation interval magnitudes and update the measurements as data sets update.

22 Claims, 4 Drawing Sheets

METHOD AND APPARATUS FOR MEASURING PARAMETERS OF AN ELECTRONIC SYSTEM

TECHNICAL FIELD

The present invention relates to a method of and apparatus for measuring parameters of an electronic system by reference to an input series of data samples received and processed so as to produce in real-time at least first and second time-varying series of measurements for a given parameter. The invention may be applied in the measurement of timing errors in digital transmission systems, for example, standardised for the measurement known as Maximum Timing Interval Error (MTIE) in Synchronous Digital Hierarchy (SDH) digital transmission systems, in accordance with specifications as set out by the telecommunications standardisation sector of the International Telecommunications Union (ITU-T).

BACKGROUND ART

Modern telecommunications networks demand a high degree of synchronisation between network transmission elements. Timing is critical for all network transmission elements in SDH architectures. However, as will be explained later, phase variations in the reference clock frequencies governing synchronous network elements may introduce errors at various stages in the network.

One measure of timing errors in synchronous digital transmission systems is known as the Maximum Time Interval Error (MTIE) and is derived from an ensemble of timing error samples. In SDH systems, the timing error samples are referred to as "Time Interval Error" or TIE samples, and a standardised maximum timing variation measure, MTIE is accordingly defined. MTIE is a measure of the time variation of a signal and can also provide information on signal frequency offsets and phase transients. MTIE values, together with other parameters, are used to evaluate the performance of equipment and systems, often to diagnose a fault which has developed and which impairs customer service.

Unfortunately, implementing directly the definition of MTIE (or similar parameters) provided by the standards bodies does not permit a real-time display of the results. In particular, MTIE is generally required to be measured in parallel for a set of different times (observation intervals), to reveal information about the time varying behaviour of the signal, and aid in the diagnosis of faults. The observation intervals typically range from one second up to a day or more. To obtain the results for such intervals conventionally requires a large quantity of data to be collected and, in principle, even for the shortest observation interval, MTIE cannot be calculated until the entire data set has been gathered. This is clearly inconvenient but if, to obtain a quicker result, MTIE for the observation intervals is calculated using a partial set of data, the calculations performed must be performed again as more data becomes available.

One known such example of a test instrument offering MTIE analysis is the ANT-20 Advanced Network Tester available from Wavetek Wandel Golternann, D-72800 Eningen u. A., Germany. This product offers off-line MTIE analysis.

Apart from the delay inherent in off-line systems, another problem with the implementation of prior solutions is the large amount of data storage and computation needed to obtain the measured values of MTIE or the like, particularly for the longer observation intervals. The ITU-T specifies a minimum sample rate of 30 Hz for the TIE measurements, while samples covering at least three times the observation interval are generally required to obtain one measurement.

It is an object of the present invention to permit real-time calculation of a set of measurements such as MTIE for a range of observation intervals, while reducing the computational burden involved. A further object is to provide current estimates of measurements for a number of observation intervals, without waiting for those intervals to elapse completely.

The inventors have recognised that an alternative method of evaluating MTIE can be achieved by providing MTIE values for a given test duration by progressively discarding insignificant data for each observation interval. This offers a real-time implementation at reasonable hardware cost. Moreover, the inventors have recognised that in such an implementation estimates of the measurement for at least the shorter observation intervals become more quickly available. Short term problems may thus reveal themselves to the engineer as the early results are replaced with new data. Results for longer observation intervals will become available as time progresses, although initial estimates for these too can even be provided more or less immediately and continuously.

One system which purports to offer real-time MTIE measurement on this basis is Flexacom Plus, advertised by ICT Electronics on the internet at http://www.ict.es. However, details of the computation and the availability of results are not known.

DISCLOSURE OF INVENTION

The invention provides a method of measuring parameters of an electronic system by reference to an input series of data samples, the data samples being processed in a first stage process so as to produce in real-time at least a first time-varying series of measurements for a given parameter characterising the data samples over observation intervals of a first magnitude (a 10 second interval in the examples), each of said observation intervals being many times longer than the sample period of the input series, the first stage process comprising:

deriving at least a first intermediate result from data samples of the input series received in a pre-determined sub-interval, and repeating the determination for successive sub-intervals so as to generate a series of first intermediate results;

storing a finite number of said first intermediate results in a first data set, such that an observation interval of the first magnitude is encompassed by the set of sub-intervals corresponding to the stored intermediate results, the first data set being updated at least once per sub-interval by discarding an oldest intermediate result and adding a new intermediate result;

deriving from the first data set a measurement of the given parameter corresponding to the observation interval and updating said measurement to generate said series of measurements as the first data set is updated.

By storing intermediate results for sub-intervals rather than for individual samples, the size of the data set(s) can be much reduced relative to the total number of samples processed, while ensuring that the entire series of samples within each observation interval is accounted for. It will be understood that "real time" in this context does not imply that results are available without delay, or must be strictly synchronised with the flow of input samples. "Real time" in this context signifies merely that input samples can be processed, on average, substantially at the rate at which the input samples are generated.

The method may further comprise a second stage process to derive at least a second series of measurements, corresponding to observation intervals of a second magnitude longer than the first (for example, a 100 second interval), said second series of measurements being derived in real time by treating the first observation intervals as sub-intervals of the second observation interval.

The second stage process may in particular comprise:

deriving from the first data set a second intermediate result corresponding to said first observation interval, and repeating the determination for successive sub-intervals of the second observation interval so as to generate a series of second intermediate results;

storing a finite number of said second intermediate results in a second data set, such that the second observation interval is encompassed by the set of sub-intervals corresponding to the stored second intermediate results, the second data set being updated at least once per sub-interval by discarding an oldest second intermediate result and adding a new second intermediate result;

deriving from the second data set a measurement of the given parameter corresponding to the second magnitude of observation interval and updating said measurement to generate said second series of measurements as the further data set is updated.

The method may similarly comprise third and fourth stage processes, each treating the observation intervals of the preceding stage as sub-intervals of a longer observation interval. The magnitude of the observation interval at each stage may correspond for example to ten of such sub-intervals.

The method may further comprise at least one intermediate stage process, to derive a further series of measurements corresponding to intermediate magnitude observation intervals, said intermediate series of measurements being derived in real time by treating a subset of the first observation intervals represented in the first data set as sub-intervals of the intermediate observation interval.

The method may further comprise deriving a further series of measurements of said parameter corresponding to observation intervals (for example one second) shorter in magnitude than the first magnitude of observation interval. Where the shorter observation interval is equal to one sub-interval of the first stage process, the data set for deriving said further series of measurements comprise a single intermediate result of the first stage process.

By the above steps, plural series of measurements corresponding to ever greater magnitudes of observation interval can be produced, with only a small number of samples requiring examination for each interval, compared with the total number of samples received during such an interval. In particular, while the magnitude of the observation interval for each additional series of measurements may be a multiple of the previous one, so that the amount of data to be processed grows exponentially with each further series of measurements, the amount of additional data stored and processed for each additional series of measurements is relatively fixed. The reduction in the overall amount of storage and calculation, when MTIE values are being calculated at once, means that real-time calculation may be carried out economically by a low cost Digital Signal Processor (DSP) solution, for example built into a portable test instrument.

In preferred embodiments of the invention, each new intermediate result is derived on a continual basis during the corresponding sub-interval as data samples are received and forms part of the data set even before the sub-interval is completed.

Initial measurements of said parameter may be derived without waiting for an interval of the first magnitude to elapse. Where each new intermediate result is derived on a continual basis, initial measurements of said parameter may be derived without waiting for even one sub-interval to elapse. Particularly where several stages are provided using first, second and subsequent data sets, the magnitude of the observation interval, and even the sub-interval can be a matter of minutes, hours, or even days. In principle, the present embodiments permit provisional results to be displayed after only one sample period.

Each intermediate result may for example comprise the minimum or maximum value of the input data samples over the corresponding sub-interval.

Each intermediate result may comprise plural components, the or each data set providing parallel lists for the different components. The first and second components stored in the data set may be used to derive measurements of separate first and second parameters, or may be used jointly to derive measurements of the given parameter.

For the calculation of MTIE or similar parameters, first and second components may be derived and stored in the data set for each sub-interval, comprising maximum and minimum values respectively, each measurement of said parameter being derived from the maximum value among the first (maximum value) components currently stored in the data set, and the minimum value among the second (minimum value) components currently stored in the data set.

The derivation of said measurement may incorporate a peak detect function, such that a value for said measurement is stored and updated selectively according to the set(s) of intermediate results.

For the calculation of MTIE, for example, a stored measurement may be updated whenever the difference between the maximum of the results currently in the first data set and the minimum of the results currently in the second data set exceeds the stored measurement.

With the optional features set forth above, various arrangements are possible, which can be chosen according to the exact observation intervals required, and the economics of a chosen implementation. The first and second processes can be implemented as a preliminary stage of a more extensive method wherein further measurements can be derived from the MTIE results, such as MRTIE and TDEV, these measurements benefiting from the increase in the speed of data processing.

The invention further provides an apparatus for measuring parameters of an electronic system by reference to an input series of data samples, the apparatus comprising means arranged to perform the steps of a method according to the invention as set forth above.

The first and second stage processes can conveniently be implemented in a single digital signal processor chip, although of course hard-wired arrangements could be used instead.

Further optional features are set forth in the dependent claims. These and other features, together with their advantages will be apparent to the skilled reader from the description of specific embodiments which follow.

BRIEF DESCRIPTION OF DRAWING

Embodiments of the invention will now be described, by way of example only, by reference to the accompanying drawings, in which.

DETAIL DESCRIPTION OF DRAWING

Figure 1:
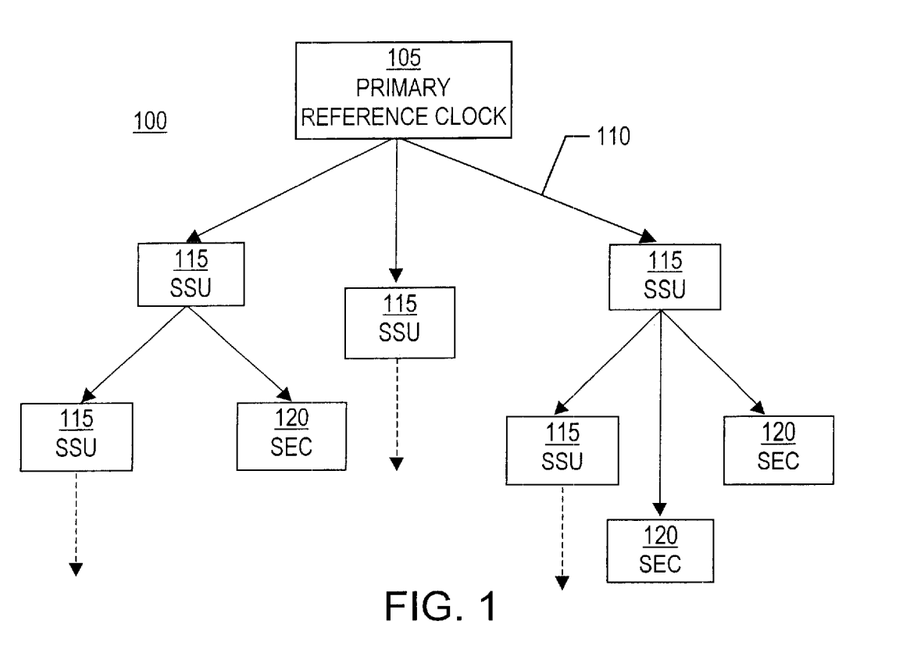
FIG. 1 is a block diagram representation of a synchronisation network.

FIG. 1 shows a simplified representation of a synchronisation network 100 forming part of a telecommunications system. A Primary Reference Clock (PRC) 105 provides the reference frequency signal which controls the synchronisation network using a Master-Slave method. The PRC is typically a source such as a caesium oscillator capable of maintaining a high quality frequency signal in accordance with ITU-T specifications. The clock signal is distributed over an SDH medium 110 to Synchronisation Supply Units (SSUs) 115 which handle the processing, generation and further distribution through the network of timing information. The SSUs help minimise degradation of the synchronisation signal as it is transported across the network from node to node. Connected to the SSU node outputs are the various SDH network devices and switching nodes. The clock generator in a SDH network is known as a SDH Equipment Clock (SEC) 120.

Degradation of synchronisation in an SDH network may be due to several factors. Common causes include variations in propagation times in cabling and frequency drifts due to temperature changes in the locking circuits used. Errors in synchronisation may also occur if an SSU or SEC operates out of the ideal locked mode and in hold-over or free-running modes. Any general re-configuration event in the synchronisation chain may give rise to transient events, as will a change of PRC in international links.

Variations in the timing signal may be broadly split into two categories. In the ITU specifications, short term variations which are of frequency greater than or equal to 10 Hz are referred to as "jitter". Longer term variations which are of frequency less than 10 Hz are referred to as "wander".

Since there are strict regulations governing timing it is necessary to have some means of measuring and identifying faults and errors. Three important measurements of network timing errors in the ITU recommendations are the Time Interval Error (TIE), Maximum TIE (MTIE), and Time Deviation (TDEV). Of principal interest for the present invention is MTIE, which is a measure of the maximum peak-to-peak delay variation of an output timing signal with respect to an ideal timing signal over a specific observation interval. MTIE is measured in units of time and is derived from a sequence of time error (TIE) samples.

The parameter MTIE is useful in the characterisation of time stability, for example as when the timing signal is affected by noise processes, frequency offsets and phase transients. MTIE can also be used to characterise equipment buffer size.

ITU-T Recommendation G.810 appendix II.5 specifies that MTIE($n\tau_0$) can be estimated by:

$$MTIE(n\tau_0) \cong \max_{1 \leq k \leq N-n} \left( \max_{k \leq i \leq k+n} x_i - \min_{k \leq i \leq k+n} x_i \right)$$

where n=1, 2, . . . , N−1

$\tau_0$ is the sampling period;

$\tau = n\tau_0$ is the observation interval;

$x_i = x(i\tau_0)$ is the i-th time error sample;

k is the observation number.

Figure 2:
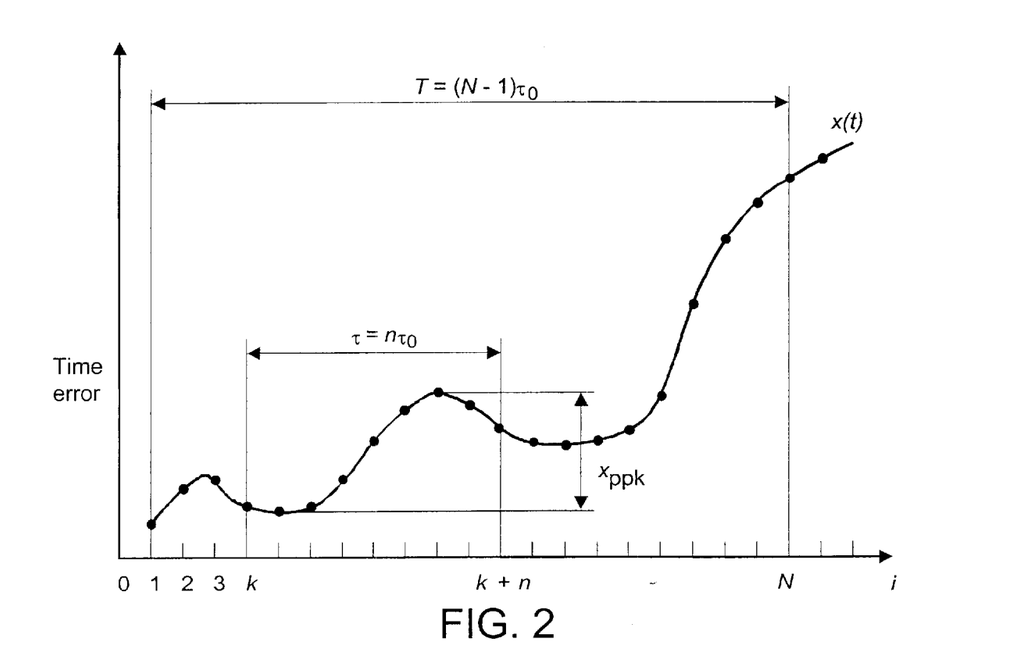
FIG. 2 is a graphical representation of the derivation of a measurement parameter for an electronic system.

FIG. 2 is a graph extracted from the ITU specification, illustrating the peak to peak measurement in interval $\tau = n\tau_0$.

If $x_{ppk}$ is defined as the peak-to-peak $x_i$ within k-th observation it can be seen that MTIE($\tau$) is the maximum for all observations of length $\tau$ within a measurement period T defined as T=(N−1)$\tau_0$.

Implementing this definition directly, MTIE may be calculated by gathering timing error samples from the equipment or network over a long period of time (depending on the longest observation interval of interest). Conventionally, this data set would then be processed off-line to obtain the best estimate for MTIE for each observation interval. Note that the estimate for even the shortest observation interval must be calculated using the entire sample set.

The amount of data which needs to be gathered is very large and may take long periods of time to collect, often extending to days, with the analysis of the data a computationally intensive task, conducted off-line. At a sampling rate of 50 Hz, for example, the TIE samples will take approximately 100 kilobytes of memory space per minute and so even comparatively short observation periods will take up large amounts of memory and a corresponding amount of time and processing power is needed to derive meaningful results. The result of this approach is that both staff and equipment resources are tied up, and results are not normally available during the test period which makes identifying cause and effect in the system being studied difficult. Further, it may take days to gather data which, when processed, indicates a problem which would have been observable after only a few minutes. Although a smaller data set could be used to obtain a preliminary value of MTIE for a short observation interval, the results cannot then conveniently be updated as new data arrives, without re-processing the whole set, or storing a large number of intermediate results.

A closely related measurement to MTIE is the Maximum Relative Time interval Error, MRTIE, which is defined by ITU-T Recommendation G.810 as the maximum peak-to-peak delay variation of an output timing signal with respect to an input timing signal within a observation interval for all observation intervals within the measurement period T. This and other similarly related measurements will also suffer from the time and computation intensive calculation processes presently employed.

Figure 3:
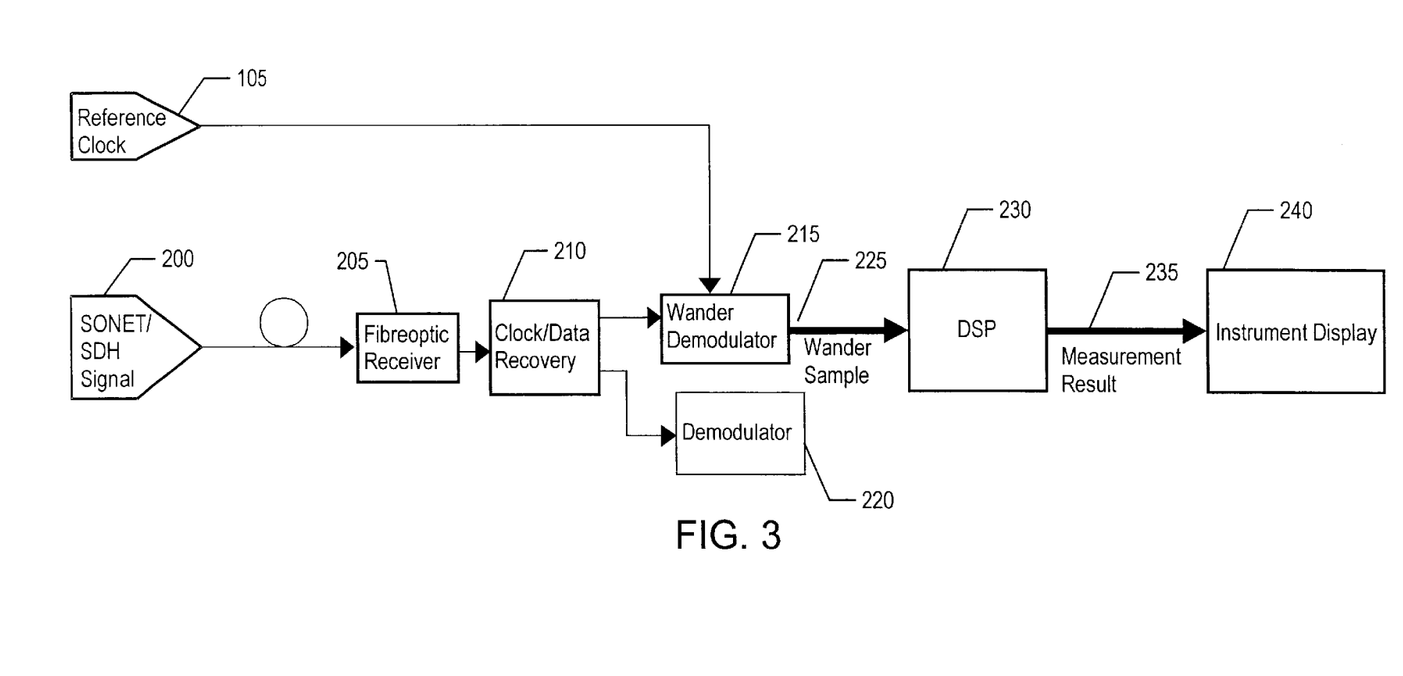
FIG. 3 is a top level block diagram of a measurement apparatus in accordance with the present invention.

FIG. 3 is a block diagram of a novel test measurement apparatus capable of providing real time MTIE measurements. In practice, the same basic instrument will be capable of deriving various measurements from the telecommunications system, such as MRTIE and TDEV, with stages common to each measurement integrated.

In this configuration an SDH signal 200 is fed into an interface block of the test equipment which consists of a fiber optic receiver 205 and a clock/data recovery module 210 which recovers the data timing signal for further processing by the wander demodulator 215. The data may be passed on to a further demodulator 220 for other uses. A signal from, for example, a reference clock 105, is obtained to provide the necessary reference timing signal.

The wander demodulator 215 has the functional ability to obtain and output TIE samples (wander samples 225) by comparing the recovered data clock signal with the reference signal. To evaluate MTIE values the wander samples 225 are passed to a digital signal processor (DSP) 230. This stage contains the functional elements needed to calculate MTIE from the wander samples. The results of processing are then recorded and/or passed at 235 to a display 240.

Various considerations for the definition and implementation of test instrumentation for measuring jitter, wander, MTIE, TDEV and the like in SDH are given in ITU-T recommendation 0.172. The present apparatus is capable of measuring a clock signal at several STM-N bit rates in use by different systems. It should be noted that the invention is in no way limited to or by these clock frequencies. The actual clock signal may be derived by several methods from the reference clock source used. The clock signal frequency required may be synthesised by, for example, techniques using phased locked loops, clock multipliers and dividers. Direct digital synthesis may be utilised if the ratio of the clock signal required and the source reference clock is not suitable for these methods. These details of implementation will be within the capability of the skilled reader, and will not be discussed further herein. In the present example, TIE is the basic function from which timing deviation MTIE, as well as other parameters, can be calculated. The wander demodulator 215 contains the necessary functionality needed to obtain TIE samples. Within demodulator 215, the test signal is first input into a phase detector which also takes as an input a reference timing signal derived from an external reference clock 105 signal as stated above. The output of this phase comparator is filtered through an equivalent 10 Hz first order, low pass filter, to separate the wander from the jitter, as defined.

The resulting TIE samples are output at 225 at a frequency of 50 Hz, which is significantly better than the minimum of 30 Hz recommended by the ITU-T in recommendation G.812/813. Measurement at this higher frequency safeguards against aliasing, when information is lost due to low sampling rates, but increases the amount of data to be processed. The accuracy of the wander measurement function is dependent on several factors including the TIE sampling interval, with serious errors occurring as the sampling interval lengthens. The invention described here is in not limited to this or any other single frequency.

Conventionally, the TIE samples are digitised and passed to, for example, a DSP device or devices for processing. MTIE is then calculated by examining the timing error over every possible observation interval size throughout the whole measurement duration. This requires the entire data set be examined for each observation interval for which a result is required. Such processes are computationally intensive and do not lend themselves to produce real time measurements.

Since a large of amount of raw data is generated in this process, in order to make real-time MTIE calculation more economic the computation effort required of the stage needed to produce results for a given period are reduced using a novel arrangement of separate stages for each observation period. This is achieved through reducing the data set needed for calculation of MTIE values for any given observation period. A reduced data set of samples can be obtained for each stage from the results of the previous stage. As a result, the storage and computational requirements for the longer-term measurement can be greatly reduced, with only modest increase in the computational burden for the shorter-term measurement.

Figure 4:
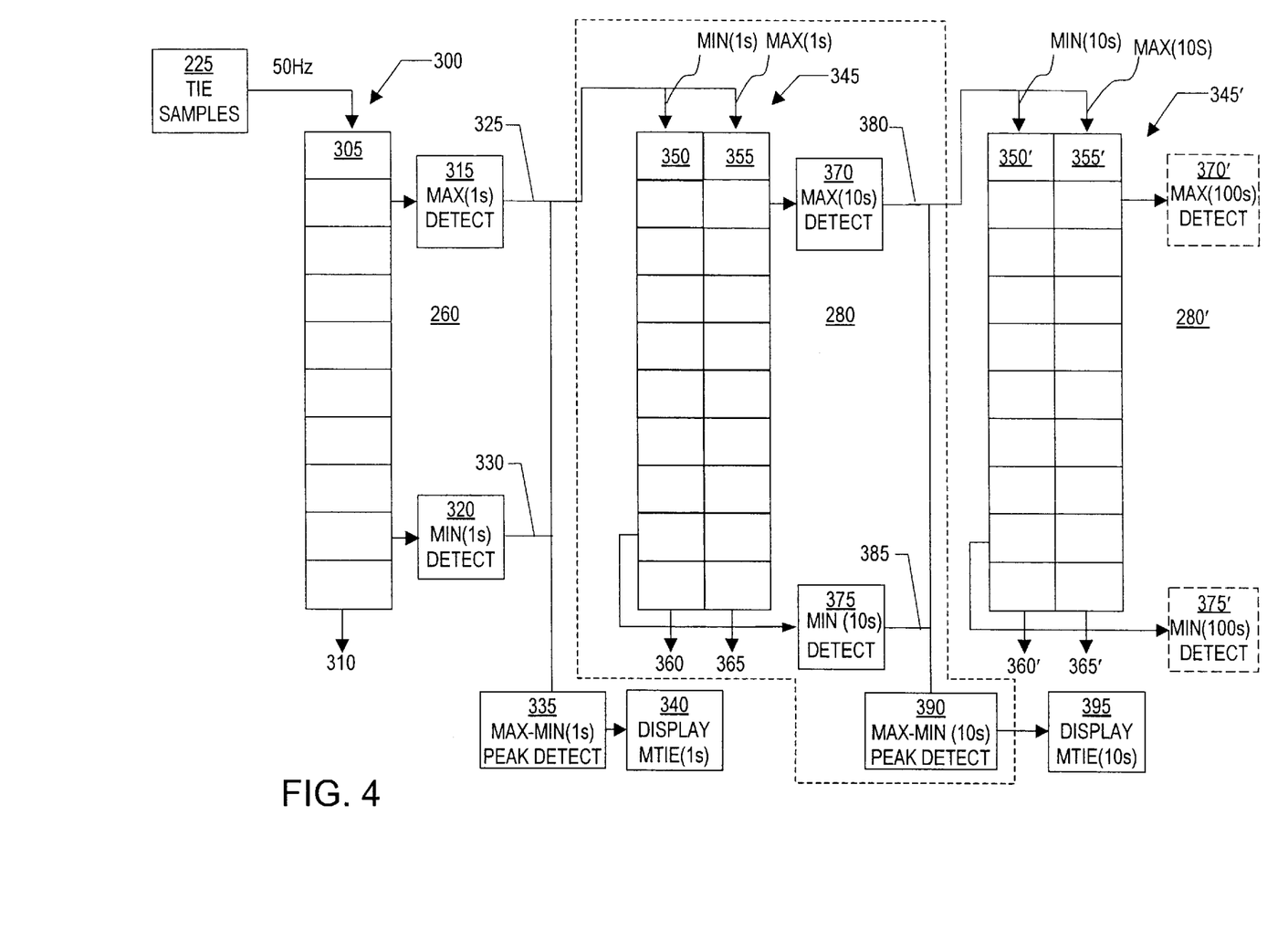
FIG. 4 is a functional block diagram of the processing stages implemented in the apparatus of FIG. 3 to measure MTIE.

FIG. 4 illustrates in block diagram form the MTIE calculation process, implemented by DSP 215, showing the data flow over observation intervals and illustrating the data reduction process for each stage. In this example the process over two observation intervals is shown in detail. The particular case illustrated is for decade intervals.

The process is carried out in stages, with an initial stage 260 corresponding to a first observation interval, in this case 1 second, and a second stage 280 corresponding to a second observation interval, here 10 seconds. Subsequent stages 280' and so on calculate MTIE for higher observation intervals. At each stage MTIE is calculated for a specific observation interval, with each stage providing a reduced data set for the next.

The initial stage 260 consists of a set of TIE samples 300. The samples are input and held on a First-In, First-Out (FIFO) basis, and with each new TIE sample 305 received, the oldest TIE sample 310 is discarded. Functional elements 315 and 320 detect maximum and minimum values respectively of the data 300 as each sample arrives. The maxima and minima 325, 330 detected are then passed to functional element 335 which evaluates the peak value of the difference between the maxima and minima detected at 305 and 310. The detected peak difference value is passed on to a display function 340.

The second stage consists of a data set 345 constructed from the maximum and minimum values 325, 330 input from elements 315, 320. This data set also operates on a First-In, First-Out (FIFO) basis with new maximum and minimum values 350, 355 being received and old values 360, 365 being discarded. Functional elements 370 and 375 calculate the maxima and minima 380, 385 for this data set as before. As before, the peak difference between the maxima and minima detected is evaluated 390 to be displayed 395.

Subsequent stages 280' are arranged in a similar manner to 280, such that each stage is provided with an input of maxima and minima values to construct new data sets, with means provided to calculate maxima and minima the new data set, and the peak difference between the maxima and minima detected. Like reference signs are used, with primes, to indicate the elements of the subsequent stage.

MTIE is arrived at for the first observation period by calculating the peak difference value between the maximum 325 and minimum sample values 330. This is a continuous process, repeated as each new sample is input into the first data set and the oldest sample is discarded, and the maximum and minimum sample values re-calculated. If the new value is larger than the previously calculated value for this observation interval then the new value replaces the old value. Thus the peak value calculated at 335 for the difference between maximum and minimum values is equivalent to the value for MTIE for the observation interval, and this value can be output for display, being continuously re-evaluated and updated.

After each instance of calculating new maximum and minimum sample values 325, 330 for the initial data set, corresponding to a first observation interval, these values are passed onto the next stage to comprise the second data set 345, held as sets of maxima 350 and minima 355. As for the previous observation interval, a maximum value and minimum sample value is found, in this case from the respective lists of maxima and minima held in the data set. MTIE for the second observation interval is then calculated and displayed, the new value replacing the old value if the new value is larger, as was described for the previous observation interval.

The minimum and maximum for this observation interval are passed on to the next stage 280' to be added to a new data set representing the next observation interval, and data derived from this set passed onto subsequent stages. This process of inputting values of maxima and minima from a previous stage is repeated for all subsequent stages, and values for MTIE for the observation intervals corresponding to those stages are evaluated as described for the second stage 280.

This process of data reduction thus continues down the stages, where MTIE for longer and longer observation intervals is measured. As a result subsequent stages need to perform less calculation than is required conventionally, allowing for a faster calculation of MTIE to be carried out. The number of stages utilised will be determined by the observation period over which it is desired to study the system under investigation.

In the preferred embodiment as described above, the processor is arranged to arrive at an immediate estimate for MTIE over the chosen range of observation intervals without having to wait for the respective observation interval to pass, and without even having to wait for the preceding observation interval to pass. This is achieved by continually re-calculating the newest maximum and minimum value in each list during the corresponding observation interval, and then "freezing" the value when it is moved down the list an a new observation interval begins. Thus each of the data sets, even those where the nominal observation interval is measured in days, has "live" data on which to base an MTIE estimate, even when only a few samples have been processed. The minimum and maximum values are calculated to be passed immediately on to the next stage, as soon as there is any value in the current data set. Empty entries in the FIFO data sets are ignored in the minimum and maximum detection, or are set to default values beyond the range of real data. MTIE can thus evaluated and displayed across a range of observation intervals and, as time passes, more and more accurate estimates of MTIE for each interval arrived at until the full set of values for the data sets of the observation intervals of interest are achieved. In principle, all the data sets could be updated with the arrival of every new sample (at 50 Hz in the example). For practical purposes, updating every 1 second, or even every ten seconds will be sufficient, of course.

The process in FIG. 4 is shown for decade observation intervals but the process could be implemented for other choices of series of observation intervals. The observation intervals and corresponding data sets may be chosen according to a number of schemes to best represent the observation period of interest. In the scheme used the structure of the lists of data comprising the data sets for observation intervals can be changed to reflect the range of observation intervals under consideration.

Figure 5:
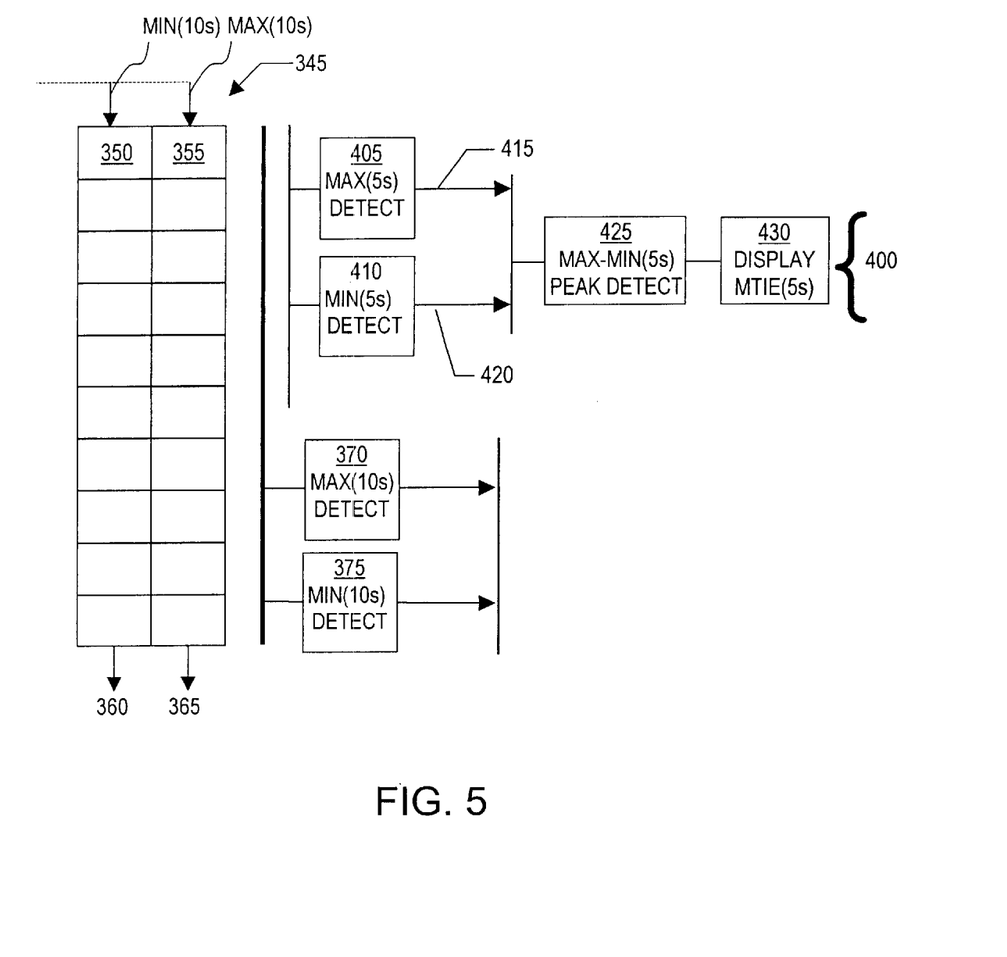
FIG. 5 shows a detail of a functional block diagram of a process to measure MTIE with additional intermediate stages.

It is also possible to implement intermediate stages in tandem of with the primary stages, for example 10 seconds in a decade scheme, for each observation interval. FIG. 5 shows a detail of a functional block diagram of a process to measure MTIE as described with an additional intermediate stages 400. In this embodiment is shown the data set 345 for an observation interval corresponding to 10 seconds. It is possible to include further functional elements 405 and 410 to detect maxima and minima 415, 420 for a subset of the stored data set, corresponding in this example to an obser­vation period of 5 seconds. The peak value for the difference between maximum and minimum detected can be evaluated at 425 and displayed 430 for a five second observation interval, in exactly the same manner as for the ten second interval, described already. This extra intermediate stage effectively increases the MTIE data resolution.

Other extra intermediate stages may be implemented for other time intervals and more than one intermediate stage may be implemented for any particular primary observation interval. For example, intermediate stages between the observation intervals of 1, 10, 100 seconds in a decade scheme may be included at 2, 5, 20 and 50 seconds and so forth.

The use of DSP techniques to implement the process stages has numerous advantages, including integration of the various functional elements at different stages needed to process the raw data to produce the MTIE results. Specia­lised hardware is used in the present apparatus for various blocks before the DSP device, for example the clock and data recovery block 210 and the wander demodulator 215. In other implementations, the DSP could carry out some of these functions, too. In particular, the wander demodulation could be integrated into the DSP system as it would elimi­nate the need to transfer sample values for the MTIE/TDEV calculations. The generation of a reference timing signal would remain an external function, with the phase detector and measurement filters being implemented in the DSP. In such an implementation the same device could therefore be used for the MTIE, TDEV and wander demodulation func­tions giving the advantage of multiple functionality simply by programming changes.

An advantageous feature of real time MTIE measurement not possible with previous static, off-line processing solu­tions is that transient phenomena may be studied in detail. Due to the stochastic nature of the calculation of MTIE in stored data processing systems transient phenomena cannot be observed in any detail. Such phenomena may include any non-stochastic event, either completely random in nature or deterministic and periodic. This would allow the observation of systematic errors and phase transients on the networks or equipment under test, for instance due to reference switch­ing.

The skilled reader will appreciate that the invention is not limited to the specific implementations and applications detailed above. It can be applied to the measurement of standardised and non-standardised parameters other than MTIE, and in electronic systems other than SDH telecom­munication networks. It can be implemented in various combinations of hardware and software, and with or without hard-wired or programmable circuits. In particular, the dedi­cated DSP unit 230 and display 240 of FIG. 4 would be replaced by a single general purpose computer for example a notebook PC connected to the instrument hardware. The entire process of FIG. 3 might then be implemented by software signal processing.

What is claimed is:

1. A method of measuring parameters of an electronic system by reference to an input series of data samples, the data samples being processed in a first stage process so as to produce in real-time at least a first time-varying series of measurements for a given parameter characterising the data samples over observation intervals of a first magnitude, each of said observation intervals being many times longer than the sample period of the input series, the first stage process comprising:

deriving at least a first intermediate result from data samples of the input series received in a pre-determined sub-interval, and repeating the determination for suc­cessive sub-intervals so as to generate a series of first intermediate results;

storing a finite number of said first intermediate results in a first data set, such that an observation interval of the first magnitude is encompassed by the set of sub-intervals corresponding to the stored intermediate results, the first data set being updated at least once per sub-interval by discarding an oldest intermediate result and adding a new intermediate result; and deriving from the first data set a measurement of the given parameter corresponding to the observation interval and updating said measurement to generate said series of measurements as the first data set is updated.

2. A method of measuring parameters of an electronic system according to claim 1 wherein a second stage process is used to derive at least a second series of measurements, corresponding to observation intervals of a second magnitude longer than the first, said second series of measurements being derived in real time by treating the first observation intervals as sub-intervals of the second observation interval, the second stage process comprising:

deriving from the first data set a second intermediate result corresponding to said first observation interval, and repeating the determination for successive sub-intervals of the second observation interval so as to generate a series of second intermediate results;

storing a finite number of said second intermediate results in a second data set, such that the second observation interval is encompassed by the set of sub-intervals corresponding to the stored second intermediate results, the second data set being updated at least once per sub-interval by discarding an oldest second intermediate result and adding a new second intermediate result; and deriving from the second data set a measurement of the given parameter corresponding to the second magnitude of observation interval and updating said measurement to generate said second series of measurements as the second data set is updated.

3. A method according to claim 2 further including third and fourth stage processes, each treating the observation intervals of the preceding stage as sub-intervals of a longer observation interval.

4. A method according to claim 2 where in said second stage process is implemented in a digital signal processor chip.

5. A computer program product for loading into a program-controlled data processing apparatus, the product comprising program instructions for causing said apparatus to implement the steps of a method as claimed in claim 2.

6. A method according to claim 1 wherein the magnitude of the observation interval at each stage corresponds to ten of said sub-intervals.

7. A method according to claim 1 wherein there is at least one intermediate stage process, to derive a further series of measurements corresponding to intermediate magnitude observation intervals, said intermediate series of measurements being derived in real time by treating a subset of the first observation intervals represented in the first data set as sub-intervals of the intermediate observation interval.

8. A method according to claim 1 wherein a series of measurements of said parameter are derived corresponding to observation intervals shorter in magnitude than the first magnitude of observation interval.

9. A method according to claim 8 wherein where the shorter observation interval is equal to one sub-interval of the first stage process, the data set for deriving said further series of measurements comprising a single one of said intermediate result of the first stage process.

10. A method according to claim 1 wherein each new intermediate result is derived on a continual basis during the corresponding sub-interval as data samples are received, and forms part of the data set before for calculation of said measurement the sub-interval is completed.

11. A method according to claim 10 wherein initial measurements of said parameter are derived without waiting for an interval of the first magnitude to elapse.

12. A method according to claim 10 wherein for the case where each new intermediate result is derived on a continual basis, and initial measurements of said parameter are derived without waiting for an interval of the first magnitude to elapse.

13. A method according to claim 1 wherein each new intermediate result comprises the minimum or maximum value of the input data samples over the corresponding sub-interval.

14. A method according to claim 13 wherein each intermediate result comprises plural components, the or each said data set providing parallel lists for the different components, and first and second components stored in the data set are used to derive measurements of separate first and second parameters.

15. A method according to claim 13 wherein each intermediate result comprises plural components, the data set providing parallel lists for the different components, and first and second components stored in the data set are used jointly to derive measurements of the given parameter.

16. A method according to claim 13 wherein first and second components are derived and stored in the data set for each sub-interval, comprising maximum and minimum values respectively, each measurement of said parameter being derived from the maximum value among the first components currently stored in the data set, and the minimum value among the second components currently stored in the data set.

17. A method according to claim 1 wherein the derivation of said measurement incorporates a peak detect function, such that a value for said measurement is stored and updated selectively according to the set(s) of intermediate results.

18. A method according to claim 17 wherein a stored measurement is updated whenever the difference between the maximum of the results currently in the first data set and the minimum of the results currently in the second data set exceeds the stored measurement.

19. A method according to claim 1 wherein said first stage process is implemented in a digital signal processor chip.

20. A computer program product for loading into a program-controlled data processing apparatus, the product comprising program instructions for causing said apparatus to implement the steps of a method as claimed in claim 1.

21. An apparatus for measuring parameters of an electronic system by reference to an input series of data samples, the apparatus being arranged to process data samples being processed in a first stage so as to produce in real-time at least a first time-varying series of measurements for a given parameter characterising the data samples over observation intervals of a first magnitude, each of said observation intervals being many times longer than the sample period of the input series, the first stage comprising:

means for deriving at least a first intermediate result from data samples of the input series received in a predetermined sub-interval, and repeating the determination for successive sub-intervals so as to generate a series of first intermediate results;

means for storing a finite number of said first intermediate results in a first data set, such that an observation interval of the first magnitude is encompassed by the set of sub-intervals corresponding to the stored intermediate results, the set of intermediate results being updated at least once per sub-interval by discarding an oldest intermediate result and adding a new intermediate result; and means for deriving from the first data set a measurement of the given parameter corresponding to the observation interval and updating said measurement to generate said series of measurements as the first data set is updated.

22. An apparatus for measuring parameters of an electronic system by reference to an input series of data samples, the apparatus being arranged to process data samples being processed in a first stage so as to produce in real-time at least a first time-varying series of measurements for a given parameter characterising the data samples over observation intervals of a first magnitude, each of said observation intervals being many times longer than the sample period of the input series, the first stage comprising:

a processor arrangement for deriving at least a first intermediate result from data samples of the input series received in a pre-determined sub-interval, and repeating the determination for successive sub-intervals so as to generate a series of first intermediate results;

a memory for storing a finite number of said first intermediate results in a first data set, such that an observation interval of the first magnitude is encompassed by the set of sub-intervals corresponding to the stored intermediate results, the set of intermediate results being updated at least once per sub-interval by discarding an oldest intermediate result and adding a new intermediate result; and the processor arrangement being arranged for deriving from the first data set a measurement of the given parameter corresponding to the observation interval and updating said measurement to generate said series of measurements as the first data set is updated.

* * * * *